(12) United States Patent
Powers

(10) Patent No.: US 8,029,842 B2
(45) Date of Patent: Oct. 4, 2011

(54) LOW WATER ACTIVITY OXYGEN SCAVENGER AND METHODS OF USING

(75) Inventor: Thomas Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 503 days.

(21) Appl. No.: 11/688,047

(22) Filed: Mar. 19, 2007

(65) Prior Publication Data

US 2007/0164254 A1 Jul. 19, 2007

Related U.S. Application Data

(62) Division of application No. 10/677,582, filed on Oct. 2, 2003, now abandoned.

(51) Int. Cl.
*B65B 55/00* (2006.01)
*B65B 25/00* (2006.01)
*B01J 19/00* (2006.01)
*B01J 20/02* (2006.01)
*C09K 15/02* (2006.01)
*C09K 3/00* (2006.01)

(52) U.S. Cl. ........ 426/392; 426/398; 426/410; 426/415; 426/418; 426/124; 422/40; 252/188.28; 252/184; 252/194; 252/385; 502/406; 502/407

(58) Field of Classification Search ............. 252/188.28, 252/184, 194, 385; 53/432, 467, 474; 422/40; 426/392, 398, 410, 415, 418, 124; 502/406, 502/407

See application file for complete search history.

(56) References Cited

U.S. PATENT DOCUMENTS

| | | | |
|---|---|---|---|
| 5,262,375 A | 11/1993 | McKedy | |
| 5,928,560 A | 7/1999 | DelDuca et al. | |
| 6,209,289 B1* | 4/2001 | Cullen et al. | .................... 53/432 |
| 6,248,690 B1 | 6/2001 | McKedy | |
| 7,214,399 B2* | 5/2007 | Froehlich et al. | ............. 426/268 |
| 7,501,011 B2* | 3/2009 | Powers et al. | .................... 96/118 |
| 2005/0072958 A1* | 4/2005 | Powers | .................... 252/188.28 |
| 2008/0057169 A1* | 3/2008 | Archibald et al. | ............. 426/410 |

OTHER PUBLICATIONS

European supplementary search report for related European application No. 04752777.5, Jun. 22, 2009.
European Patent Office, First Communication, date Jun. 22, 2009, 5 pages.
Vaclavik et al.: Essentials of Food Science (Second Edition) © 2003 Springer Science+ Business Media, Inc. (5 pages).
Canadian Office Action in corresponding Canadian Application No. 2,540,554 dated Mar. 28, 2011 (3 pages).

* cited by examiner

*Primary Examiner* — Joseph D Anthony
(74) *Attorney, Agent, or Firm* — Stephen B. Salai, Esq.; Paul A. Leipold, Esq.; Harter Secrest & Emery LLP

(57) ABSTRACT

An oxygen-absorbing composition, device, and method for oxygen scavenging in a low moisture environment are provided. The present invention provides an oxygen absorbing composition which includes an oxygen reducing agent, water, a carrier, an electrolyte salt, and a humectant salt, which may be the same as the electrolyte salt, present in an amount sufficient to reduce the water activity of the composition to below 0.6. Also included are methods of using the composition.

12 Claims, 1 Drawing Sheet

LOW WATER ACTIVITY OXYGEN SCAVENGER AND METHODS OF USING

CROSS-REFERENCE TO RELATED APPLICATIONS

This application is a Divisional of U.S. patent application Ser. No. 10/677,582 filed Oct. 2, 2003.

STATEMENT REGARDING FEDERALLY SPONSORED RESEARCH OR DEVELOPMENT

Not Applicable

FIELD OF INVENTION

The present invention relates to oxygen-absorbents, and more specifically to oxygen-absorbing compositions, devices, and methods of storage for low-moisture environments.

BACKGROUND OF THE INVENTION

Oxygen is typically detrimental to food and pharmaceuticals. There are, therefore, many technologies in existence to reduce oxygen in food, pharmaceutical, medical device, and diagnostic product storage environments, such as plastic containers, pouches, cases, bottles and the like. But the need to limit oxygen exposure is not limited to just these applications. Many products can have longer shelf-lifes if oxygen is diminished, including paints and other consumer goods.

One technique that has recently been the subject of development involves the placement of oxygen absorbing packages into the product package to protect against spoilage, loss of potency, or other loss of value due to oxidation of the product. These packages themselves contain oxygen absorbers, or scavengers, and are added into or constructed into sealed packages. The sealed containers having the oxygen scavenging packages within them have been used to lengthen shelf-life of many products. Some examples of this include preserving oils from rancidity, foods from developing mold and bacteria growth, pharmaceuticals from loss of potency, sensitive diagnostic products from oxidation, electronics from corrosion and archives and artifacts from yellowing and embrittlement.

The typical oxygen absorber depends upon oxidation of iron or similar metal to reduce oxygen. Other techniques include the use of chemical or biochemical methods but these are typically limited in application by relatively low capacity, low rate of reaction, and higher cost.

Metal-based oxygen absorbers function by oxidizing the metal while reducing oxygen to the oxide form. It is an electrolytic reaction which requires moisture and an electrolyte in order to proceed. This reaction occurs readily in a high water activity environment such as $A_w$=0.8-1.0, but slows considerably below $A_w$=0.8. This is fine for the storage and preservation of products which tolerate a heightened moisture environment, but is not acceptable where such is not the case.

An improved oxygen-absorbing composition or system would allow for oxygen scavenging in a relatively low moisture environment.

SUMMARY OF THE INVENTION

The present invention provides oxygen-absorbing compositions, devices, and methods for oxygen scavenging in a low moisture environment. Generally, the present invention provides an oxygen absorbing composition comprising at least one oxygen reducing agent, water, a carrier, an electrolyte salt(s), and a humectant salt(s), which may be the same as the electrolyte salt, present in an amount sufficient to reduce the water activity of the composition to below 0.6.

More specifically, the present invention includes as one embodiment an oxygen scavenging composition comprising 30-70 wt % electrolytic iron, 10-40 wt % carrier (or stabilizer), 10-20 wt % water, 1-10 wt % sodium chloride, and 1-30 wt % humectant salt. A more preferred embodiment is an oxygen scavenging composition comprising 30-55 wt % electrolytic iron, 25-37 wt % silica gel, 10-15 wt % water, 3-6 wt % sodium chloride, and 3-6 wt % humectant salt.

The present invention also includes a device for scavenging oxygen within a low-moisture container, the device comprising an oxygen absorbing composition comprised of an oxygen reducing agent, water, a carrier, an electrolyte salt, and a humectant salt, which may be the same as the electrolyte salt, present in an amount sufficient to reduce the water activity of the composition to below 0.6; and a barrier to enclose the oxygen absorbing composition and retain the oxygen absorbing composition within the low-moisture container. The barrier allows the passage of oxygen to the composition and limits (or retards) the escape of moisture out of the composition. When the moisture does equilibrate, the ERH of the container will not exceed the ERH of the oxygen scavenging composition itself.

Also included as a part of the present invention is a method of making an oxygen absorbing composition for use in a low-moisture environment comprising the steps of (a) dissolving an electrolyte salt and a humectant salt in water, wherein the humectant salt may be the same as the electrolyte salt, the salt(s) itself may be a reducing agent, and wherein the humectant salt and electrolyte salt are present in sufficient amount to reduce the water activity of the composition to below 0.6; (b) mixing the solution of step (a) with a carrier (where the carrier may have some water binding capability); (c) blending the mixture of step (b) with at least one reducing agent; and (d) placing the blend of step (c) within a barrier, the barrier allowing the passage of oxygen to the blend and limiting (or retarding) the escape of moisture away from the blend.

Also included is a method of storing moisture-sensitive, oxygen-sensitive substances in a low-moisture, low-oxygen environment. The method comprises placing a moisture-sensitive, oxygen-sensitive substance into an oxygen-permeable container having an environment with an equilibrium relative humidity of less than 50%; and disposing an oxygen-scavenging composition within the oxygen-permeable container, the oxygen-scavenging composition disposed within an oxygen-permeable barrier and having a water activity less than 0.60.

BRIEF DESCRIPTION OF THE DRAWING

The FIGURE illustrates a device containing the composition of the present invention to reduce oxygen content within a container housing a dosage form pharmaceutical.

DETAILED DESCRIPTION OF THE INVENTION

Figure 1:
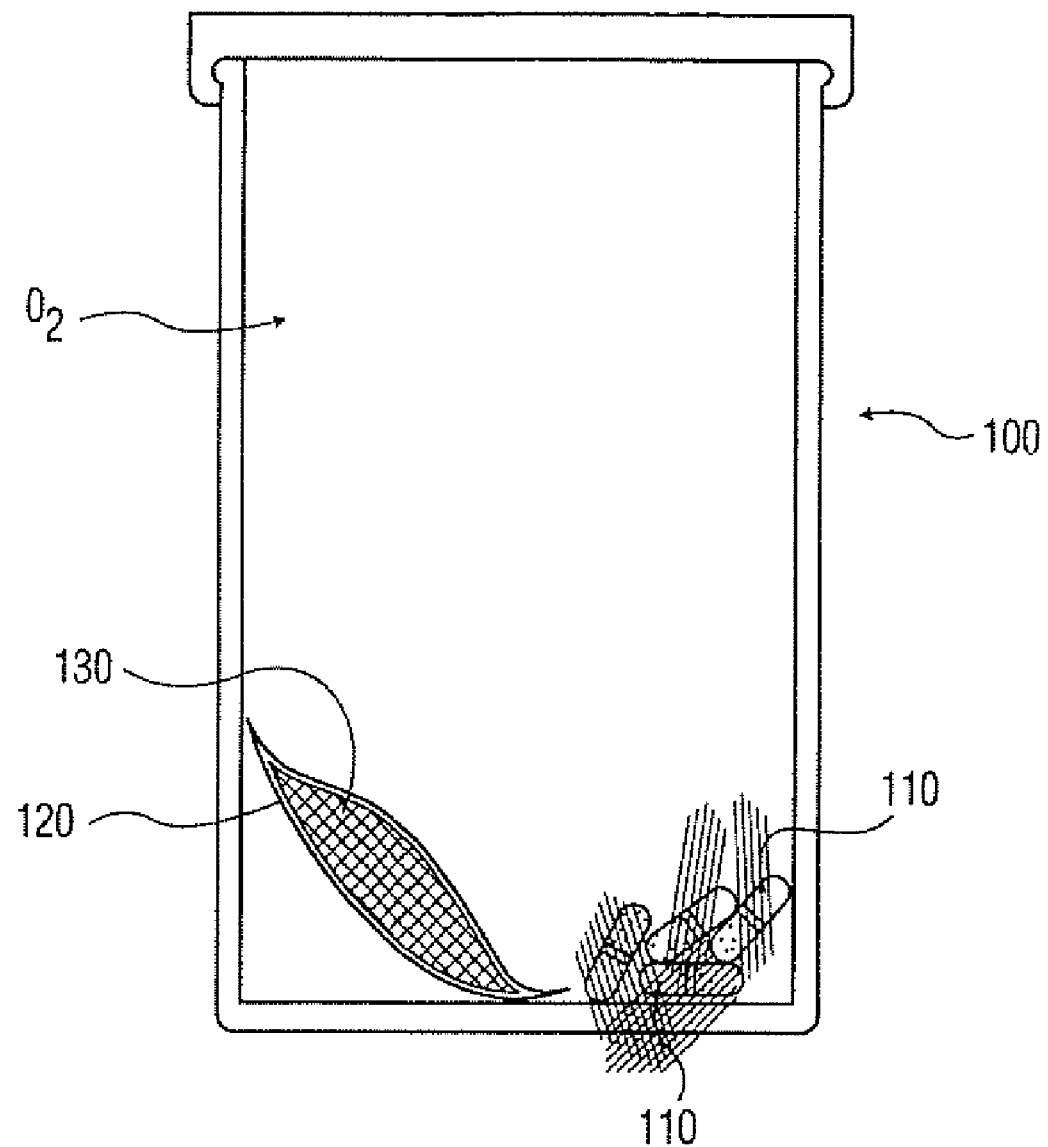

The present invention provides compositions, devices, and methods for storing moisture-sensitive, oxygen-sensitive substances in a low-moisture, low-oxygen environment. One example of such a use is shown in the FIGURE, which illustrates a container 100 housing a pharmaceutical product, in this case capsules 110. Typical such containers would be made from any of a number of materials, including polyethylene (both HDPE and LDPE), polypropylene, polystyrene, and polycarbonate.

The container allows some oxygen to enter the space surrounding pharmaceutical capsules 110, despite being made of a material which generally resists oxygen passage. In such a case, the oxygen which does manage to pass through the container wall must be absorbed in order to prolong the useful life of pharmaceutical capsules 110.

The FIGURE also shows the presence of one embodiment of the present invention, namely sachet 120 which contains oxygen absorbing composition 130. In other embodiments, the barrier could be a canister, capsule, cartridge, label, or other form instead of a sachet. The barrier (e.g. sachet) is made of a material (described in more detail below) which allows oxygen to pass through but limits water passage. This oxygen permeability and water (non)permeability are also defined in more detail below. Generally, and as noted above, the oxygen absorbing composition needs a certain level of moisture to adequately absorb oxygen, yet humid environments are undesirable from the standpoint of the stored product (in this case capsules 110). The present invention thus has adequate water present in the sachet, which water is generally restricted from leaving the sachet. Moreover, oxygen enters the dry container environment, passes through the barrier material into the sachet interior and is absorbed within the oxygen scavenging composition, all while water presence is generally limited to within the sachet. It is this control of water activity between the container environment and sachet environment which forms part of the invention in conjunction with appropriate oxygen scavengers (described in more detail below).

Water activity, typically represented by the variable, $A_w$, is an indicator of the free moisture content of a substance, but is not simply the percent weight of water within a substance. Often, the total moisture content of a substance is defined as the percentage weight of water in relation to the dry weight of the substance. This number is also different than the water activity value.

Substances in which moisture can be present can be classified in two categories: hygroscopic and non-hygroscopic. Included among hygroscopic materials are salts, most metal oxides, and many polymers. Hygroscopic substances may absorb water in different ways. Depending on the absorption process, water is bound to the product with more or less strength. Moisture content can include both an immobilized part (e.g. water of hydration) and an active part. Water activity $A_w$ (or equilibrium relative humidity (ERH)) measures the vapor pressure generated by the moisture present in a hygroscopic product (% ERH=$A_w \times 100$). Water activity reflects the active part of moisture content or the part which, under normal circumstances, can be exchanged between the substance and its environment. It is essentially a measure of "available" water as opposed to "total" water content.

The active part of moisture content and, therefore, water activity, provides better information than the total moisture content regarding the micro-biological, chemical and enzymatic stability of perishable products such as food or pharmaceuticals. Water activity can also be directly compared with the relative humidity of the ambient air to prevent dimensional changes in a product such as paper or photographic film, and to prevent hygroscopic powders (powdered sugar, salt) from caking or turning into a solid block.

Although a water activity of 0.3-0.5 would typically be satisfactory for some drug compounds, others are stable only if the equilibrium relative humidity (ERH) of the environment is 20% or less ($A_w \leq 0.20$). The problem with such an environment, however, is that oxygen scavengers need at least a minimal level of water activity in order to absorb oxygen. Thus, the competing forces of a dry environment which is necessary for the product to exist, and a moist environment which the scavenger needs in order to absorb oxygen, oppose each other to create a problem for one wishing to absorb oxygen in a dry environment.

The present invention solves this problem by utilizing an effective oxygen absorbing composition which has a self-contained and limited water supply so that the composition can work in a relatively low moisture environment. The composition itself is contained within a package material that has barrier properties to maintain the relatively low moisture environment outside of the package. Thus, the present invention provides a system where the oxygen scavenging package material holds the necessary moisture within the package to support the oxygen scavenging reaction while maintaining a relative humidity outside the package (but within the container, in other words the environment outside the oxygen scavenging package but inside the product container, such as a pill bottle) at less than the $A_w$ of the oxygen absorbing formula and below the level at which detrimental effects of moisture would impact the container's contents (e.g. a pharmaceutical). More specifically, a product which is otherwise stable at <60% relative humidity can be protected from oxidation by this oxygen absorber.

The combination of a scavenging agent and electrolyte with water in a suitable carrier has been known as an oxygen absorbing composition. The present invention, however, also contains a humectant salt, which is used to bind moisture within the oxygen absorbing composition such that water activity of the composition remains high relative to the ERH of the environment outside of the package which surrounds the stored product (e.g. pharmaceutical or food). It is noted that over enough time (typically several months or years) a steady state condition will be reached. By steady state, it is meant that eventually the water activity inside the package will essentially equilibrate with the relative humidity outside of the package, and although oxygen absorption will still occur within the package, moisture content within the container will have effectively risen to detrimental levels, given enough time. The important aspect of the present invention, however, is that early in the term of storage (early part of the shelf-life), the oxygen absorption is occurring readily in a low moisture container. This is especially beneficial in the first few weeks of storage as this is the time when a relatively high amount of oxygen is present within the container as a result of typical packaging conditions. Thus, after closure of the container following packaging, oxygen is quickly removed from the container's inner environment, despite there being a very dry environment within the container. Heretofore, such dry environments meant poor oxygen absorption.

Typical reducing agents used with the present invention include iron, copper, zinc, sulfides, sulfites, ascorbic acid, salts of ascorbic acid, chlorine, iodine, bromine, carotenoids, tocopherol, polyphenols, and combinations thereof. Preferred among these is iron, and in particular a 200 mesh electrolytic iron powder.

Carriers used with the present invention include silica (and silica gel), clay, cellulose, natural and synthetic silicates, a gelling agent, and combinations thereof.

Humectant salts used with the present invention include sodium chloride, calcium chloride, lithium chloride, iodides, carbonates, sulfate salts, and combinations thereof. Preferred among these are sodium chloride and calcium chloride.

As noted above, the package material should have limited water permeability but relatively high oxygen permeability. By limited water permeability, it is meant that the escape of water from the package be adequately limited or retarded so that adequate moisture is present within the package to support oxygen absorption. In general, as long as the oxygen permeability exceeds that of water permeability, the barrier will work in accordance with the present invention. Such materials can be quantitatively defined as any which has a vapor transmission rate preferably no greater than 0.5 g/100 in$^2$/day at 100° F., 90% RH, and more preferably no greater than 0.1 g/100 in$^2$/day at 100° F., 90% RH. By relatively high oxygen permeability, it is meant that the oxygen transmission rate should be at least 20 cc/100 in$^2$/day at 73° F. 50% RH, and preferably greater than 50 cc/100 in$^2$/day at 73° F. 50% RH.

Preferred among these materials are laminated films or film and paper composite structures. More preferred are laminates of water-oil-grease resistant paper and linear low density polyethylene (LLDPE) film. Included among preferred embodiments are linear low density polyethylene films laminated to an Aclar film (Aclar is a fluorine-containing plastic in sheet form and is a trademark of Honeywell International Inc.). In such a film, the LLDPE acts as both the seal and semi-permeable layer. Generally, however, appropriate barrier materials would include materials comprising polyethylene, polypropylene, polyester, nylon, ionomer, and laminated combinations thereof, so long as they exhibit the permeabilities defined above.

The barrier itself could take many forms, including sachets, canisters, capsules, self-adhesive laminates, and labels. The self-adhesive laminate could be used in a variety of applications, including as a backing layer for a blister-pack application or as a label for a food or pharmaceutical package.

The present invention includes the use of a device for scavenging oxygen within a low-moisture container. The device is comprised of an oxygen absorbing composition and a barrier to enclose the oxygen absorbing composition and retain the oxygen absorbing composition within the low-moisture container. The oxygen composition comprises at least one oxygen reducing agent, water, a carrier, an electrolyte salt, and a humectant salt, which may be the same as the electrolyte salt, present in an amount sufficient to reduce the water activity of the composition to below 0.6. The barrier is selected such that it allows the passage of oxygen to the composition and limits the escape of moisture out of the composition.

Also included as a part of the present invention is a method of making an oxygen absorbing composition for use in a low-moisture environment. Generally, the method comprises the steps of: (a) dissolving an electrolyte salt and a humectant salt in water, wherein the humectant salt may be the same as the electrolyte salt, and wherein the humectant salt and electrolyte salt are present in sufficient amount to reduce the water activity of the composition to below 0.6; (b) mixing the solution of step (a) with a carrier; (c) blending the mixture of step (b) with at least one reducing agent; and (d) placing the blend of step (c) within a barrier, the barrier allowing the passage of oxygen to the blend and limiting the escape of moisture away from the blend. The components used in this method are as defined above.

Finally, the present invention also includes a method of storing moisture-sensitive, oxygen-sensitive substances in a low-moisture, low-oxygen environment. The method comprises the steps of placing a moisture-sensitive, oxygen-sensitive substance into an oxygen-permeable container having an environment with an equilibrium relative humidity of less than 50%; and disposing an oxygen-scavenging composition within said oxygen-permeable container, said oxygen-scavenging composition disposed within an oxygen-permeable barrier and having a water activity less than 0.60. As above, the components used in this method are as defined above.

The following examples demonstrate the effectiveness of the present invention.

EXAMPLE 1

An oxygen-absorbing blend was prepared by combining 20 grams (g) sodium chloride (NaCl), 10 g ascorbic acid ($C_6H_8O_6$), and 10 g sodium ascorbate (Na—$C_6H_7O_6$) with 60 g of water. This mixture was combined 45/55 with silica gel. The blend was found to have an ERH of 59%. Seventy-five one hundredths of a gram (0.75 g) of this blend was mixed with 0.75 g of 200 mesh electrolytic iron and sealed within a semipermeable sachet.

The sachet was placed within a high barrier test container with a measured amount of air and was found to absorb over 200 cc of oxygen in 60 days in a dry atmosphere. During this time the ER within the test container did not exceed 51%.

EXAMPLE 2

An oxygen absorbing blend was prepared by combining 10 g sodium chloride and 20 g calcium chloride with 70 g of water. This mixture was combined 45/55 with silica gel. The blend was found to have an ERH of 48.3%

Two grams (2 g) of this blend was mixed with 1 g of 200 mesh electrolytic iron and sealed within a semipermeable sachet. The sachet was a laminate of water-oil-grease resistant paper and a linear low density polyethylene film. The film had a water vapor transfer rate of 0.456 g/100 in$^2$/day @ 100° F., 90% r.h. and an oxygen transfer rate of 61.8 cc/100 in$^2$/day @ 73° F., 50% r.h.

The sachet was placed within a high barrier test container with 500 cc of air and was found to absorb over 37 cc of oxygen in 66 days in a dry atmosphere.

EXAMPLE 3

An oxygen absorbing blend was prepared by combining 10.4 g sodium chloride, 20.8 g calcium chloride, and 68.8 g of water. This mixture was combined 45/55 with silica gel.

1.2 g of this blend was mixed with 1.2 g of 200 mesh electrolytic iron, combined with 0.1 g of a 50% dispersion of a binder (polyvinyl pyrollidone) and sealed within a semipermeable canister. The canister was constructed of a cylindrical polyethylene body and a film end material. The end material had a water vapor transfer rate of 0.008 g/100 in$^2$/day and an oxygen transfer rate of 45 cc/100 in$^2$/day @ 73° F., 50% r.h.

The canister was placed within a high barrier test container with a measured amount of air and was found to absorb oxygen at the rate of 0.85 cc/day. During this time the ERH within the test container did not exceed 56.9%. The same formulation ceased to absorb after 13 days in a permeable sachet.

EXAMPLE 4

An oxygen absorbing blend was prepared by combining 10 g sodium chloride, 40 g potassium iodide, and 50 g of water. This mixture was combined 45/55 with silica gel. The blend was found to have an ERH of 43.8%.

Two grams (2 g) of this blend was mixed with 1 g of 200 mesh electrolytic iron and sealed within a semipermeable sachet. The sachet was a laminate of water-oil-grease resistant paper and a linear low density polyethylene film. The film had a water vapor transfer rate of 0.456 g/100 in$^2$/day @ 100° F., 90% r.h. and an oxygen transfer rate of 61.8 cc/100 in$^2$/day @ 73° F., 50% r.h.

The sachet was placed within a high barrier test container with a measured amount of air and was found to absorb over 97 cc of oxygen in 52 days in a dry atmosphere.

The following table summarizes the above examples. The electrolytic iron was 200 mesh in each case.

| EXAMPLE | Composition | Performance |
|---|---|---|
| 1 | 50 wt % electrolytic iron<br>27.5 wt % silica gel<br>13.5 wt % water<br>4.5 wt % NaCl<br>2.25 wt % Na ascorbate<br>2.25 wt % Ascorbic acid | This composition was placed in semi-permeable sachet and absorbed over 200 cc of oxygen in 60 days in a dry atmosphere. During this time the ERH within the test container did not exceed 51%. |
| 2 | 50 wt % electrolytic iron<br>27.5 wt % silica gel<br>15.75 wt % water<br>2.25 wt % NaCl<br>4.50 wt % CaCl$_2$ | This composition was placed in semi-permeable sachet and absorbed over 37 cc of oxygen in 66 days in a dry atmosphere. |
| 3 | 48 wt % electrolytic iron<br>26.1 wt % silica gel<br>14.9 wt % water<br>2.34 wt % NaCl<br>4.68 wt % CaCl2<br>3.98 wt % binder | This composition was placed in semi-permeable canister and was found to absorb oxygen at the rate of 0.85 cc/day in a dry atmosphere. During this time the ERH within the test container did not exceed 56.9%. |
| 4 | 33.33 wt % electrolytic iron<br>36.67 wt % silica gel<br>15.0 wt % water<br>3.0 wt % NaCl<br>12 wt % KI | This composition was placed in selectively-permeable sachet and absorbed over 97 cc of oxygen in 52 days in a dry atmosphere. |

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method of storing moisture-sensitive, oxygen-sensitive substances in a low-moisture, low-oxygen environment, said method comprising:
    placing a moisture-sensitive, oxygen-sensitive substance into an oxygen-permeable container having an environment with an equilibrium relative humidity of less than 50%; and disposing an oxygen-scavenging composition within said oxygen-permeable container, said oxygen-scavenging composition disposed within an oxygen-permeable barrier and having a water activity less than 0.60, wherein the oxygen-scavenging composition is comprised of:
    30-70 wt % electrolytic iron;
    10-40 wt % silica gel;
    10-20 wt % water;
    1-10 wt % sodium chloride;
    3-30 wt % humectant salt selected from the group consisting of calcium chloride, lithium chloride, iodides, carbonates, salfate salts, and combinations thereof; and
    wherein the barrier comprises an oxygen scavenging package and the package holds the necessary moisture within the package to support the oxygen scavenging reaction while maintaining the moisture inside the package below the level that would impact the container's contents.

2. The method of claim 1 wherein the barrier is comprised of a material selected from the group consisting of a linear low density polyethylene laminate, a laminated film composite, and a laminated film and paper composite.

3. The method of claim 1 wherein the barrier is selected from the group consisting of a sachet, a canister, a self-adhesive laminate, a label, and a capsule.

4. The method of claim 1 wherein the oxygen-permeable barrier is comprised of a material selected from the group consisting of polyethylene, polypropylene, polyester, nylon, ionomer, and laminated combinations thereof.

5. The method of claim 1 where the barrier is a sachet and water is restricted from leaving the sachet.

6. The method of claim 1 wherein said barrier has a water transmission rate no greater than 0.5 g/100 in$^2$/day at 100° F. and 90% RH.

7. The method of claim 6 wherein the water transmission rate is no greater than 0.1 g/100 in$^2$/day at 100° F. and 90% RH.

8. The method of claim 1, wherein the barrier has an oxygen transmission rate of at least 2000/100 in$^2$/day at 73° F and 50% RH.

9. The method of claim 7 wherein the barrier has an oxygen transmission rate greater than 50 cc/100 in$^2$/day at 73° F and 50% RH.

10. The method of claim 1 wherein said barrier comprises low density polyethylene laminated to a fluorine containing plastic sheet.

11. The method of claim 1 wherein the humectant salt comprises calcium chloride.

12. The method of claim 1 wherein the oxygen scavenging composition does not contain carbon.

* * * * *